UNITED STATES PATENT OFFICE 2,175,101

PROCESS FOR SOFTENING TEXTILES

Otto Albrecht, Basel, Switzerland, assignor to the firm Society of Chemical Industry in Basle, Basel, Switzerland No Drawing. Application April 20, 1935, Serial No. 17,541. In Switzerland April 21, 1934

6 Claims. (Cl. 252—1)

This invention is based on the observation that products of the general formula

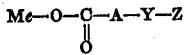

in which Me stands for an alkali metal or ammonium, A for an alkyl- cycloalkyl- or aryl-residue, Y for a

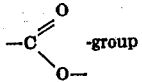

-group which is attached to the alkyl, cycloalkyl- or aryl-residue A by means of the carbon atom or the oxygen atom, and Z for an aliphatic residue having at least 8 carbon atoms, are valuable softening agents for the textile, leather, paper and allied industries.

Products of the general formula

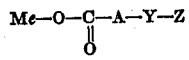

are, for example, the salts of the following acids esterified once with aliphatic, but preferably normal alcohols containing at least 8 carbon atoms and, if desired, having branched chains:— aliphatic, cycloaliphatic or aromatic dicarboxylic acids, for instance adipic acid, succinic acid, ethylene-α:β-dicarboxylic acids, phthalic acid, isophthalic acid, terephthalic acid, substituted phthalic acids, such as chlorophthalic acids; hexahydrobenzenedicarboxylic acids, such as hexahydrophthalic acids. Suitable alcohols or substituted alcohols are the alcohols corresponding with the higher fatty acids, such as octyl-, decyl-, lauryl-, myristyl-, cetyl-, octadecyl-alcohols or mixtures of these, such as are obtainable, for example, by reducing higher saturated or unsaturated fatty acids or fatty acids containing oxy-groups, or esters of such acids, for instance coconut oil, castor oil or the like. Also unsaturated higher alcohols, for instance olein-alcohol or the alcohols from spermaceti oil may be used, or the ethyleneglycols obtained, for example, by hydrating unsaturated alcohols, or the products obtainable by adding halogen to unsaturated alcohols. There are also suitable the alcohols obtainable from montan wax, and such alcohols as are obtainable by the scission of waxes, for example beeswax, or by the oxidation of paraffin hydrocarbons. Secondary alcohols can also be obtained by reduction of aliphatic ketones, such as palmitone, stearone, pentadecyl-methylketone. The hydroxyl-groups may be primary, secondary or tertiary. The carbon chains of the higher alcohols may also be interrupted by divalent atoms, such as oxygen or sulfur. Hydroxy-derivatives of this kind are for example higher polyglycols, polyglycerins, diethyleneglycol-mono-butylether; also substituted higher aliphatic alcohols, such as castor oil or another ester of a hydroxy-fatty acid, such as hydroxystearic acid-ethylester, may be used.

Products of the said general formula in which Y is united to the residue A by the oxygen atom are salts of the esters of aliphatic cycloaliphatic or aromatic hydroxycarboxylic acids, for instance glycolic acid, lactic acid, hexahydro-hydroxy-benzoic acids, for example hexahydro-salicylic acid, hydroxybenzoic acid or hydroxynaphthoic acids, such as salicylic acid on the one hand, and aliphatic saturated or unsaturated carboxylic acid or carboxylic acids containing hydroxy-groups or halogen atoms, in each case having at least 8 carbon atoms, on the other hand. Among these esters may be named, for example, lauryl-, palmityl-, stearyl-, oleyl-glycolic-acid, lauryl-hexahydrosalicylic acid, palmitylsalicylic acid.

For making the said ester acids of aliphatic, cycloaliphatic or aromatic dicarboxylic acids one may heat, for example, the corresponding anhydride with the equivalent proportion of the alcohol to be esterified, if desired in the presence of a solvent, like benzene. One can also heat the free acids with the alcohol until the calculated proportion of water has been eliminated, if desired in presence of an esterifying catalyst, or of a substance which forms an azeotropic mixture with water. Partial hydrolysis of the corresponding neutral ester may in certain cases also serve to produce the acid ester.

The aliphatic, cycloaliphatic or aromatic hydroxy-carboxylic acids can be acylated by causing the corresponding aliphatic acid halide, if desired in the presence of an acid binding agent, such as pyridine, to act upon the hydroxycarboxylic acid; or the halogenated carboxylic acid corresponding with the hydroxycarboxylic acid or the salt of such halogenated carboxylic acid may be caused to react with a salt of a higher aliphatic carboxylic acid at a high temperature, in which case it is advantageous to use a catalyst which increases the reactivity of the halogen atom, for instance finely subdivided copper, copper sulfate or the like.

The products to be used in this invention impart to fibers treated with them, particularly artificial silk consisting of regenerated cellulose or of organic derivatives of cellulose, such as viscose-, acetate- or copper artificial silk, a full and soft grip. The products can be obtained easily in completely colourless state and are therefore suitable for the treatment of undyed textiles or textiles dyed light tints. Since the products give no precipitates with dyestuffs which dye in acid or neutral baths they may be added directly to the dye-bath, whether this is made with soft or hard water. The textiles may also be after-treated with dilute solutions. The products have the further advantage that they are both wetting and washing agents. They may be used alone or in admixture with other suitable materials as washing agents or finishing agents.

The following examples illustrate the invention:—

Example 1

A viscose artificial silk is dyed in hard water amounting to 30 times its weight in a vat containing 2 per cent., calculated on the weight of the silk, of Direct Sky Blue green shade (compare Colour Index, No. 518), 30 per cent. of crystallized Glauber's salt and 0.4 per cent. of the ammonium salt of the semi-ester obtained by heating 74 parts by weight of phthalic acid anhydride with 128 parts by weight of the commercial mixture of hexadecyl- and octadecyl-alcohol. After handling the goods for 1 hour at a temperature near the boiling point, the material is rinsed in ordinary water, centrifuged and dried. The goods then have a soft, fleecy grip.

Example 2

A white viscose artificial silk web is treated for 20 minutes in a lukewarm bath containing, calculated on the weight of the goods, 0.5 per cent. of the ammonium salt of the hexahydro-phthalic acid-oleylalcohol-semi-ester. It is wrung out and dried. The artificial silk thus treated is characterised by a soft, smooth feel.

The ammonium salt to be used may be obtained by heating 1 mol. hexahydro-phthalic acid-anhydride with 1 mol. oleic alcohol at 165° C. and neutralizing the product with a solution of ammonia. With similar result there may be used the ammonium salt of the stearyl-salicylic acid obtainable from salicylic acid and stearic acid chloride in pyridine solution.

What I claim is:

1. A process of softening fibrous material which comprises treating the material with an aqueous solution of a product of the general formula $$Me-O-\underset{\underset{O}{\|}}{C}-A-Y-Z$$

in which Me stands for a member of the group consisting of an alkali metal and ammonium, A for an unsulfonated aryl radical of the benzene series, Y for a

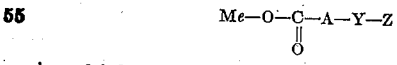

which is attached to the aryl radical A by means of the carbon atom and Z for an aliphatic radical having at least 8 carbon atoms in a straight chain.

2. A process of softening fibrous material which comprises treating the material with an aqueous solution of a product of the general formula $$Me-O-\underset{\underset{O}{\|}}{C}-A-Y-Z$$

in which Me stands for a member of the group consisting of an alkali metal and ammonium, A for an unsulfonated aryl radical of the benzene series, Y for a

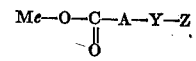

which is attached to the aryl radical A by means of the carbon atom and Z for an aliphatic radical having at least 16 carbon atoms in a straight chain.

3. A process of softening fibrous material which comprises treating the material with an aqueous solution of a product of the general formula $$Me-O-\underset{\underset{O}{\|}}{C}-A-Y-Z$$

in which Me stands for a member of the group consisting of an alkali metal and ammonium, A for an unsulfonated aryl radical of the benzene series, Y for a

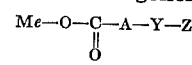

which is attached to the aryl radical A by means of the carbon atom and Z for an aliphatic radical having at least 18 carbon atoms in a straight chain.

4. A bath for softening textiles, consisting of an aqueous liquid which is characterized by containing products of the general formula

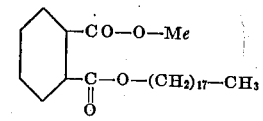

in which Me stands for a member of the group consisting of an alkali metal and ammonium.

5. A bath for softening textiles, consisting of an aqueous liquid which is characterized by containing products of the general formula

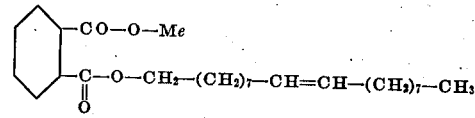

in which Me stands for a member of the group consisting of an alkali metal and ammonium.

6. A bath for softening textiles, consisting of an aqueous liquid which is characterized by containing products of the general formula

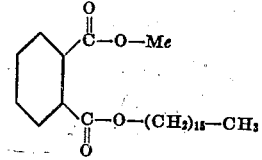

in which Me stands for a member of the group consisting of an alkali metal and ammonium.

OTTO ALBRECHT.